(12) United States Patent
Brown

(10) Patent No.: US 12,313,204 B2
(45) Date of Patent: May 27, 2025

(54) FLUID CONTAINERS AND FILTER ASSEMBLIES WITH EXTERNALLY AND INTERNALLY THREADED ADAPTERS

(71) Applicant: Aquamira, LLC, Logan, UT (US)

(72) Inventor: Dennis B. Brown, La Verkin, UT (US)

(73) Assignee: AQUAMIRA, LLC, Logan, UT (US)

( * ) Notice: Subject to any disclaimer, the term of this patent is extended or adjusted under 35 U.S.C. 154(b) by 43 days.

(21) Appl. No.: 18/318,129

(22) Filed: May 16, 2023

(65) Prior Publication Data

US 2024/0384823 A1 Nov. 21, 2024

(51) Int. Cl.

| | |
|---|---|
| *F16L 55/07* | (2006.01) |
| *B01D 29/11* | (2006.01) |
| *B01D 35/30* | (2006.01) |
| *B65D 51/24* | (2006.01) |
| *F16L 15/00* | (2006.01) |

(52) U.S. Cl.
CPC .............. *F16L 55/07* (2013.01); *B01D 29/11* (2013.01); *B01D 35/30* (2013.01); *B65D 51/24* (2013.01); *F16L 15/00* (2013.01); *F16L 15/007* (2013.01); *B01D 2201/4092* (2013.01)

(58) Field of Classification Search
CPC ..... F16L 15/002; F16L 15/007; F16L 15/006; F16L 47/16; F16L 41/14; F16L 55/07; F16L 55/115; F16L 55/1152; B01D 29/11; B01D 35/30; B01D 2201/4092
See application file for complete search history.

(56) References Cited

U.S. PATENT DOCUMENTS

| | | | |
|---|---|---|---|
| 2,992,018 A * | 7/1961 | Rosan | |
| 3,549,177 A * | 12/1970 | Sotolongo | |
| 4,453,749 A * | 6/1984 | McKinnon | |
| 4,796,928 A * | 1/1989 | Carlin | F16L 15/007 |
| 5,335,703 A * | 8/1994 | deJong | |
| 6,854,888 B1 * | 2/2005 | Brown | |
| 11,161,650 B2 * | 11/2021 | Macchiarella | |
| 2007/0095943 A1* | 5/2007 | Turnbull | |
| 2015/0300543 A1* | 10/2015 | Boaz | F16L 55/07 |
| 2015/0316182 A1* | 11/2015 | Brown | |

(Continued)

OTHER PUBLICATIONS

International Search Report and Written Opinion mailed Sep. 18, 2024 in International Application No. PCT/US24/29633, 13 pages.

*Primary Examiner* — William S. Choi
(74) *Attorney, Agent, or Firm* — Perkins Coie LLP; Joshua M. Nelson; David McNeill

(57) ABSTRACT

A threaded adapter comprises first externally-facing threads having a first diameter; second externally-facing threads at a first end of the adapter, the second externally-facing threads having a second diameter less than the first diameter, and third externally-facing threads at a second end opposite to the first. The adapter further comprises a first interior region adjacent the first end having a first opening and a first cylindrical shape with a first interior diameter; a second interior region adjacent the second end having a second opening and a second cylindrical shape with a second interior diameter less than the first; and a step region between the first and second interior regions including a seating surface perpendicular to axes of the cylindrical shapes. The first interior region, the step region, and the second interior region are axially aligned and configured to permit a fluid to pass between the first and second end.

20 Claims, 10 Drawing Sheets

(56) References Cited

U.S. PATENT DOCUMENTS

| | | |
|---|---|---|
| 2019/0046907 A1 | 2/2019 | Willems |
| 2020/0096138 A1* | 3/2020 | Bean |
| 2020/0246730 A1 | 8/2020 | Dieker |
| 2020/0299985 A1* | 9/2020 | Saccoccio ........... F16L 55/1152 |
| 2021/0253331 A1* | 8/2021 | Bullock |

* cited by examiner

106

112

106

112

FLUID CONTAINERS AND FILTER ASSEMBLIES WITH EXTERNALLY AND INTERNALLY THREADED ADAPTERS

TECHNICAL FIELD

The present disclosure generally relates to threaded adapters, and more particularly relates to externally and internally threaded adapters for fluid containers and filter assemblies.

BACKGROUND

Many fluid container accessory items in the outdoor and beverage industries—such as push-pull and valved caps—are designed solely with the exit of the fluid and the interface with the user in mind. Much less thought has been focused on conveniently getting fluids or other objects, such as ice cubes or filtration devices, into the container.

DETAILED DESCRIPTION

Many fluid container accessory items—such as push-pull and valved caps—are designed solely with the exit of the fluid and the interface with the user in mind. Many standard designs, however, feature openings that are too narrow to allow ice cubes to pass into the container, or to allow filters to be situated within the container—two benefits that are critically important in the beverage industry generally, and the outdoor industry specifically, where a user may only have access to water from impure or dubious sources (e.g., a stream or lake). Such an interiorly situated filter would take advantage of the user's ability to squeeze the container to express the fluid through the filter. Attempts to install filters on the inside of the container are also hampered by the small diameter of the opening, usually resulting in reduced filter surface area, limited filter life and difficult flow. As a result, the default method is for the user to use a separate method or device to accomplish the filtration requirement.

Attempts have been made to improve the access to the flexible containers. These additional fittings usually manifest themselves as an additional larger diameter fitting and screw cap that is welded into a panel of the container, or an additional opening in a seam such as a zipper or a clamp type fitting. They also tend to clutter the flexible container and make it more difficult to collapse, fold, or roll up. All of these separate fittings or openings add expense, complexity, and additional potential areas of leakage due to poor sealing or lack of attention by the user.

To address these drawbacks and others, various embodiments of the present disclosure provide externally and internally threaded adapters configured for fluid containers and filter assemblies. The adapters are configured to accept a standard format filter, which can be accessed by removing the adapter from a threaded insert that attaches within an opening on the fluid container.

Figure 1A:
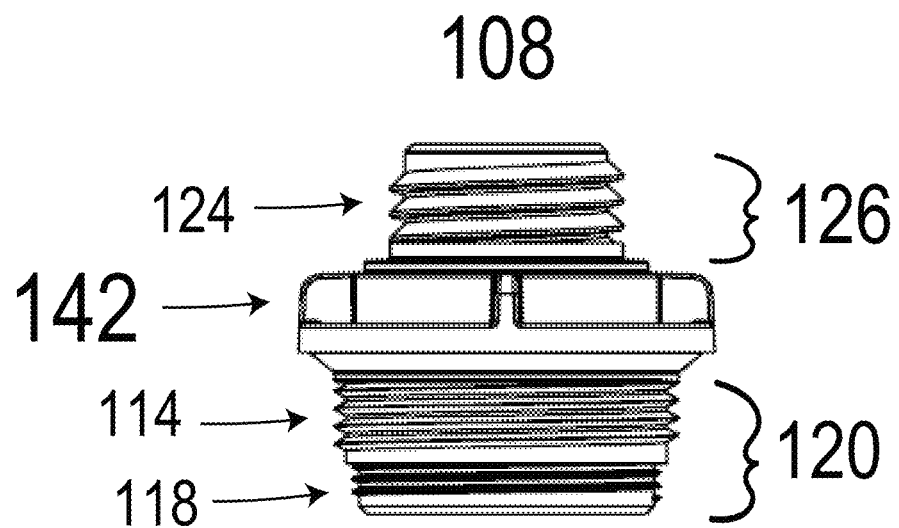
FIG. 1A is a side view of a threaded adapter in accordance with embodiments of the present technology.
Figure 1B:
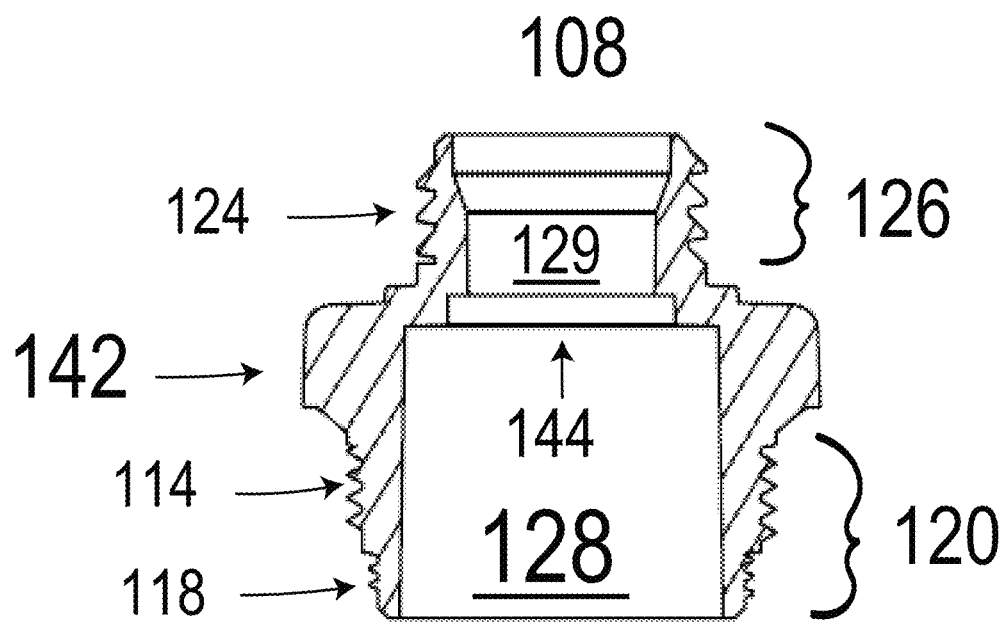
FIG. 1B is a cutaway view of a threaded adapter in accordance with embodiments of the present technology.

FIG. 1A is a side view, and FIG. 1B a cutaway view, of a threaded adapter 108 in accordance with embodiments of the present technology. The threaded adapter 108 can be configured to retain a filter within a fluid container body. The threaded adapter 108 includes first externally-facing threads 114 having a first diameter. The first externally-facing threads 114 can be configured to engage with first internally-facing threads to secure the adapter 108 in a threaded insert, illustrated in a later Figure. The threaded adapter 108 also includes second externally-facing threads 118 at a first end 120 (e.g., an inward end, or an intruding end) of the adapter 108, the second externally-facing threads 118 having a second diameter less than the first diameter. The threaded adapter 108 also includes third externally-facing threads 124 at a second end 126 (e.g., an external end, or an extruding end) of the adapter 108. The second end 126 can be configured to extend away from a fluid container body. The threaded adapter 108 also includes a first interior region 128 belonging to the first end 120 having a first opening and a cylindrical shape with a first interior diameter. The threaded adapter 108 also includes a second interior region 129 belonging to the second end 126 having a second opening and a cylindrical shape with a second interior diameter less than the first interior diameter. The threaded adapter 108 also includes a step region 144 between the first interior region 128 and the second interior region 129 including a seating surface perpendicular to axes of the first and second cylindrical shapes. The first interior region 128, the step region 144, and the second interior region 129 are axially aligned and configured to permit a fluid to pass between the first end 120 and the second end 126 of the threaded adapter.

Additionally, the threaded adapter 108 can include a ridged ring 142, as illustrated, to provide leverage for insertion and removal. The threaded adapter 108 can also include a filter with a cylindrical shape and diameter configured to insert into the second opening and form a friction-fit within the first interior region 128. In such an embodiment, the filter has a length and the first interior region 128 has a depth. Additionally, the filter can connect and seal to the seating surface of the step region 144 by means of a valve seal, by means of an O-ring, by means of a gasket, or by means of a bayonet-type connection.

Figure 1C:
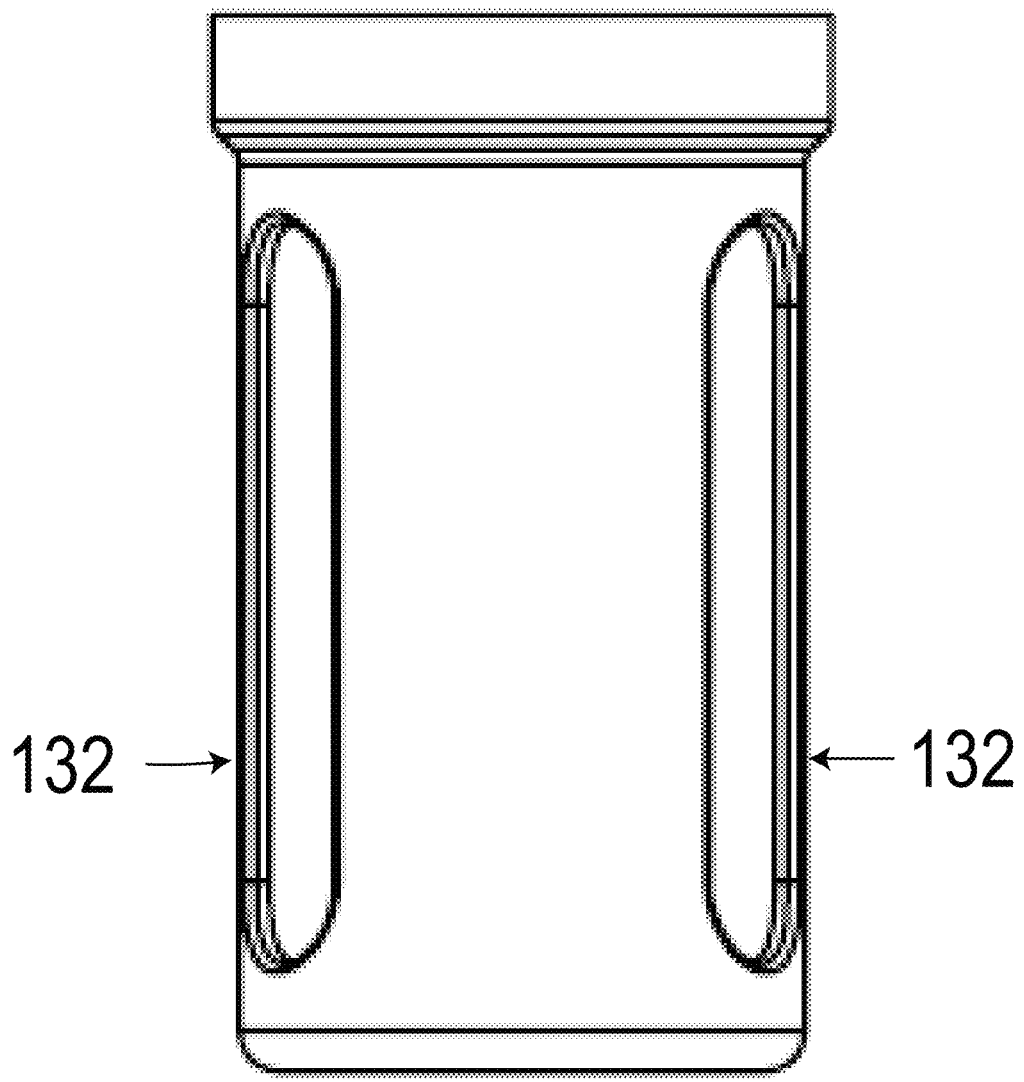
FIG. 1C is a side view of a filter cage belonging to a threaded adapter, in accordance with embodiments of the present technology.

FIG. 1C is a side view of a filter cage 130 belonging to the threaded adapter 108, in accordance with embodiments of the present technology. The filter cage 130 includes second internally-facing threads configured to secure the filter cage 130 to the second externally-facing threads 118 of the threaded adapter 108. The filter cage 130 includes an interior volume configured to retain a canister filter and gaps 132 configured to permit fluid to pass from the fluid container body 102 to the interior volume of the filter cage 130. In some embodiments, the fluid container 100 includes a filter held within the filter cage 130. In such embodiments, the filter has a third cylindrical shape and an exterior diameter configured to insert into the first opening and form a friction-fit within the first interior region 128. The filter has a length and the first interior region 1328 has a depth. In such embodiments, the filter has a length and the first interior region 128 has a depth, and the seating surface of the step region 144 includes an inlet, configured to attach to the filter and form a seal. The inlet can include a mating O-ring seal, a valve seal, a gasket, or a bayonet-type connection. Additionally, the depth of the first interior region 128 can be at least equal to the length of the filter and extend beyond the opening 104 of the fluid container. In such embodiments, the threaded adapter 108 can be configured to hold the filter outside of the body 102 of the fluid container while the first externally-facing threads 114 engage with the first internally-facing threads 112. Alternatively, in other embodiments, the depth of the first interior region 128 can be less than the length of the filter. In such embodiments, the second externally-facing threads 118 can be configured to extend into the fluid container body 102 when the adapter 108 is secured in the threaded insert 106 by the first externally-facing threads 114. Additionally, in such embodiments, the threaded adapter 108 can be configured to hold the filter inside the body 102 of the fluid container while the first externally-facing threads 114 engage with the first internally-facing threads 112.

Figure 1D:
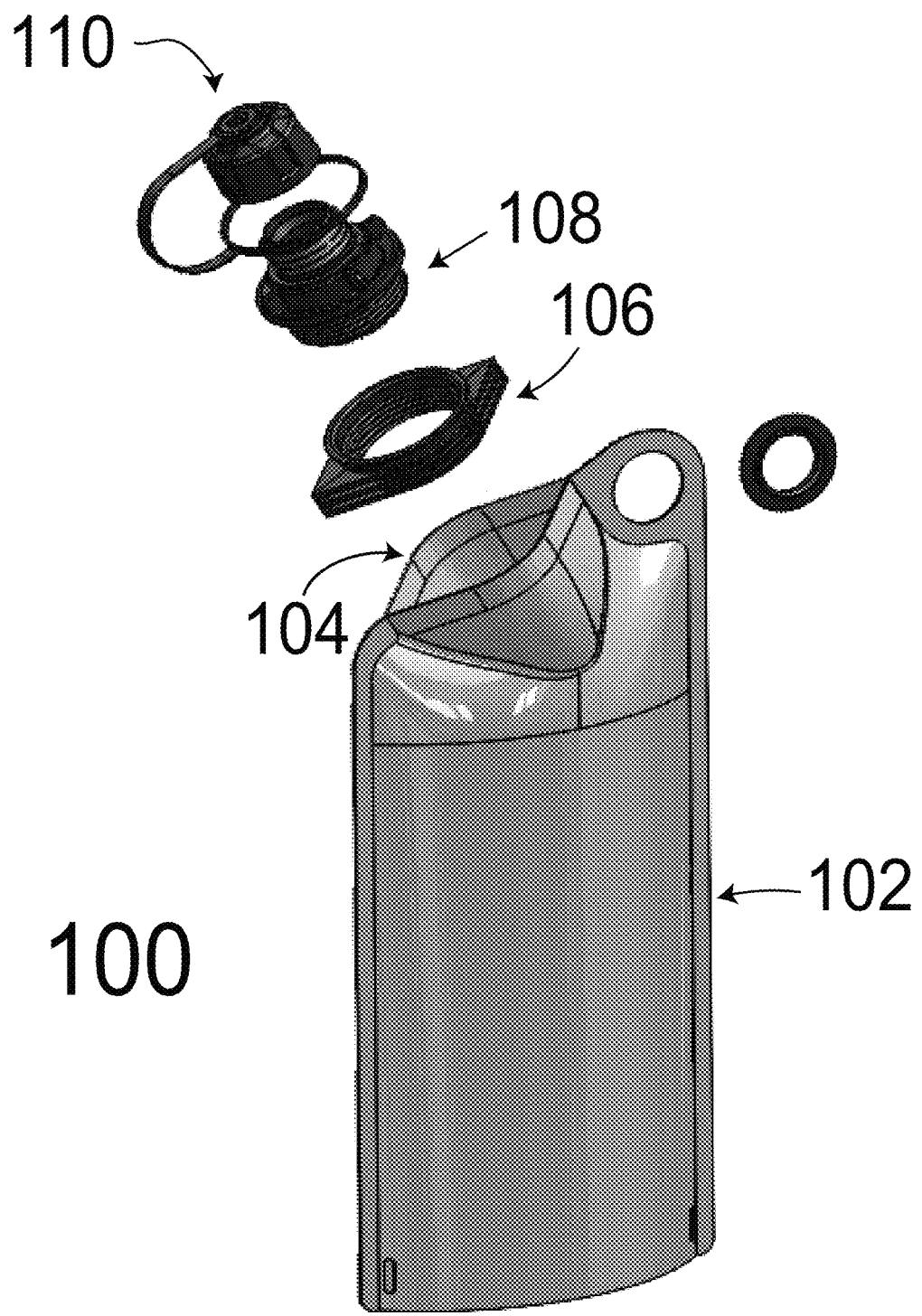
FIG. 1D is a perspective view of a fluid container in accordance with embodiments of the present technology.

FIG. 1D is a perspective view of a fluid container 100 in accordance with embodiments of the present technology. The fluid container 100 includes a body 102 for containing a fluid, the body 102 having an opening 104. The body can have soft sides, as illustrated, or hard sides, and/or the opening can be a seam, a mouth, a neck, or a hole. The fluid container 100 includes a threaded insert 106 disposed in the opening 104. The threaded insert 106 can be seam-welded in the opening 104 of the fluid container 100 or molded as part of the opening 104 using direct heat, Ultrasonic, or Radio Frequency welding techniques. Alternatively, the threaded insert 106 can be attached to the opening 104 of the fluid container 100 by means of a bulkhead fitting, in which the bulkhead fitting seals to the opening 104 by means of a gasket or a valve seal. Alternatively, the threaded insert 106 and/or the threaded adapter 108 can be welded into a panel (using gas welding, RF welding, or Ultrasonic welding, etc.). The fluid container 100 also includes a threaded adapter 108 configured to retain a filter within the body 102. The threaded adapter 108 includes first externally-facing threads having a first diameter and configured to engage with the first internally-facing threads to secure the adapter 108 in the threaded insert 106. The threaded adapter 108 also includes second externally-facing threads at a first end of the adapter 108, the second externally-facing threads having a second diameter less than the first diameter. The threaded adapter 108 also includes third externally-facing threads at a second end of the adapter, which are configured to extend away from the body when the adapter is secured in the threaded insert by the first externally-facing threads. The threaded adapter 108 also includes a first interior region, a second interior region, and a step region between the first interior region and the second interior region including a seating surface perpendicular to axes of the first and second cylindrical shapes. The first interior region, the step region, and the second interior region are axially aligned and configured to permit a fluid to pass between the first end and the second end of the threaded adapter.

Additionally, the threaded adapter 108 includes a filter cage with second internally-facing threads configured to secure the filter cage to the second externally-facing threads. The filter cage includes an interior volume configured to retain a canister filter, as well as gaps configured to permit fluid to pass from the fluid container body 102 to the interior volume of the filter cage. The fluid container 100 also includes an external attachment 110. The external attachment 110 includes third internally-facing threads configured to secure the external attachment 110 to the third externally-facing threads of the adapter 108. In various embodiments, the external attachment can be a filter, a straw filter, a cap, straw cap, a sip cap, a standard cap, a tethered cap, a spigot, a spout, a dispensing valve, a bite valve, a tube connector, a hose, a primer pump, or a shower head.

Figure 1E:
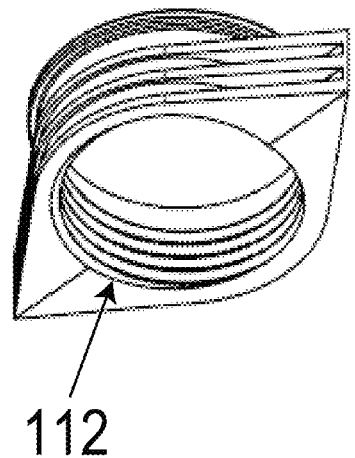
FIGS. 1E and 1F are perspective views of threaded inserts 106 belonging to a threaded adapter, in accordance with embodiments of the present technology.
Figure 1F:
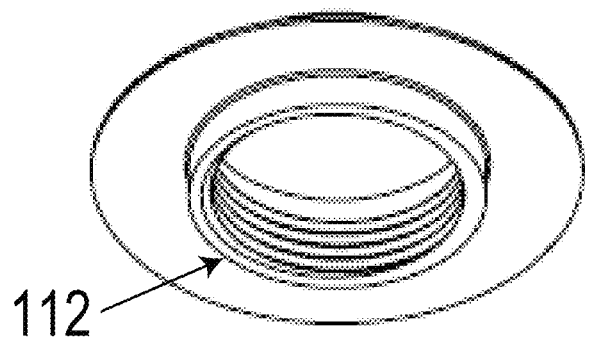

FIG. 1E and FIG. 1F are perspective views of threaded inserts 106 belonging to the threaded adapter 108, in accordance with embodiments of the present technology. Both threaded inserts 106 include first internally-facing threads 112, configured to engage with the first externally-facing threads of the threaded adapter 108 and secure the adapter 108 in the threaded insert 106. The threaded insert 106 can have a football shape or a prolate spheroid shape, as illustrated in FIG. 1E, configured to attach to the opening 104 of the fluid container 100. In such embodiments, the opening 104 can be a seam, and the fluid container 100 can be a flexible container, a collapsible container, or a foldable container, as illustrated in FIG. 1D. Alternatively, the threaded insert 106 can have a circular shape with a flat flange, as illustrated in FIG. 1F, and the insert 106 can be configured to attach to the opening 104 of the fluid container 100, where the opening 104 can be a hole, a mouth, or a neck, and the fluid container 100 can be a rigid container, a semi-rigid container, or a hard-sided container.

Figure 2:
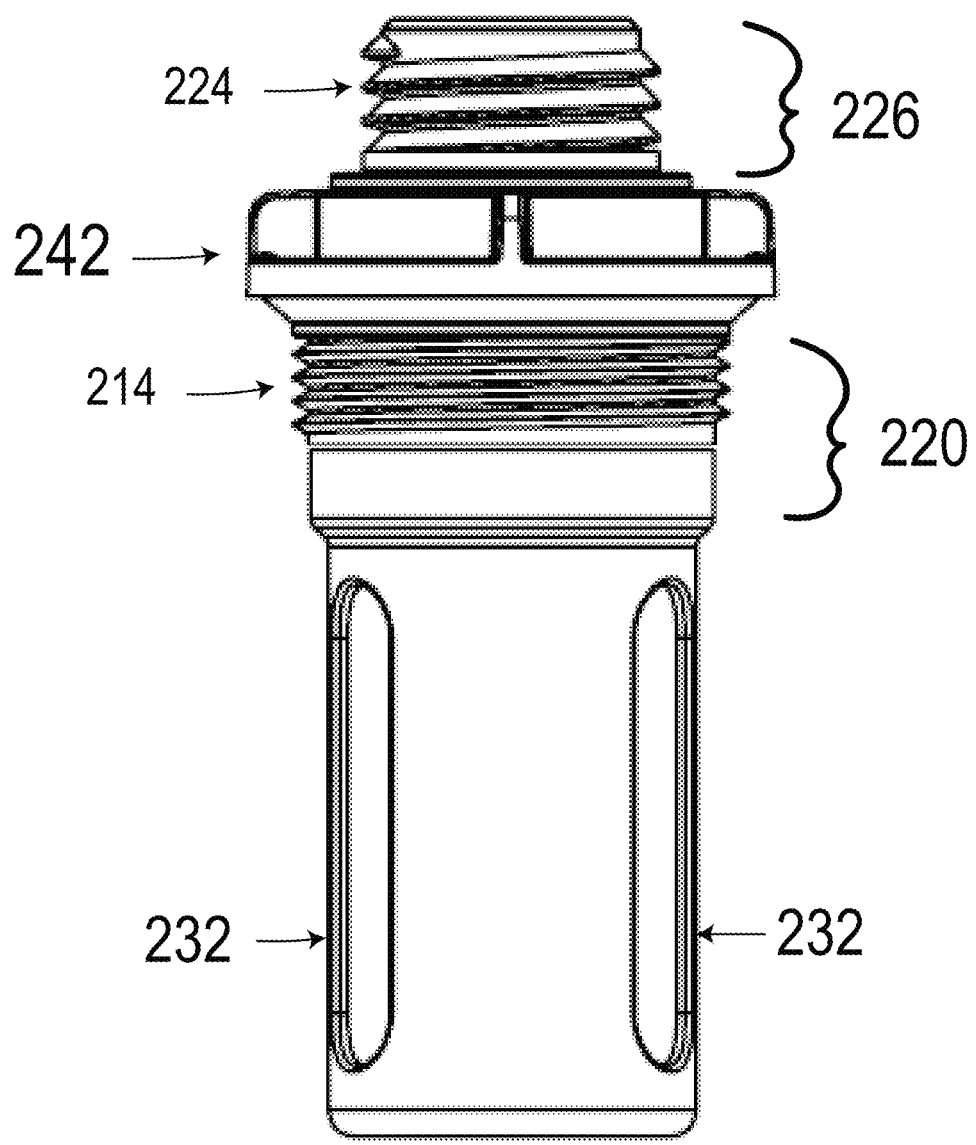
FIG. 2 is a side view of a threaded adapter configured to retain a filter within a fluid container, in accordance with embodiments of the present technology.

FIG. 2 is a side view of a threaded adapter 208 configured to retain a filter within a fluid container, in accordance with embodiments of the present technology. The threaded adapter 208 includes first externally-facing threads 214 having a first diameter and configured to engage with first internally-facing threads of the fluid container. The threaded adapter 208 includes second externally-facing threads at an inward end 220 of the adapter 208. The second externally-facing threads have a second diameter less than the first diameter and are configured to extend into the fluid container when the adapter 208 is secured in the fluid container by the first externally-facing threads 214. The threaded adapter 208 includes third externally-facing threads 224 at an exterior end 226 of the adapter 208, which are configured to extend away from the fluid container when the adapter 208 is secured to the fluid container by the first externally-facing threads. The threaded adapter 208 also includes a first interior region belonging to the inward end having a first opening and a cylindrical shape with a first interior diameter. The threaded adapter 208 also includes a second interior region belonging to the second end having a second opening and a cylindrical shape with a second interior diameter less than the first interior diameter. The threaded adapter 208 also includes a step region between the first interior region and the second interior region including a seating surface perpendicular to axes of the first and second cylindrical shapes. The first interior region, the step region, and the second interior region are axially aligned and configured to permit a fluid to pass between the inward end 220 and the exterior end 226 of the threaded adapter.

The threaded adapter 208 includes a filter cage 230 with second internally-facing threads configured to secure the filter cage 230 to the second externally-facing threads. The filter cage includes an interior volume configured to retain a canister filter and openings 232 configured to permit fluid to pass therethrough. Additionally, the threaded adapter 208 can include a ridged ring 242, as illustrated, to provide leverage for insertion and removal.

The threaded adapter 208 can include a fluid container and a filter with a third cylindrical shape and an exterior diameter configured to insert into the first opening and form a friction-fit within the first interior region. The filter can have a length, the first interior region can have a depth, and the fluid container can have first internally-facing threads and a body. The body can have soft sides, as illustrated, or hard sides, and/or the opening can be a seam, a mouth, a neck, or a hole. In such embodiments, the second externally-facing threads are configured to extend into the fluid container when the adapter 208 is secured in the fluid container by the first externally-facing threads 214, and the third externally-facing threads 224 are configured to extend away from the fluid container when the adapter 208 is secured to the fluid container by the first externally-facing threads 214. Additionally, the first internally-facing threads can be integral within an opening of the fluid container. In some embodiments, the filter extends into the first interior region of the threaded adapter 208. In such embodiments, the seating surface of the step region includes an inlet configured to attach to the filter and form a seal. The inlet can include a mating O-ring seal, a valve seal, a gasket, or a bayonet-type connection. Additionally, the depth of the first interior region can be at least equal to the length of the filter and extend beyond the opening of the fluid container. In such embodiments, the threaded adapter 208 can be configured to hold the filter outside of the body of the fluid container while the first externally-facing threads 214 engage with the first internally-facing threads. Alternatively, in other embodiments, the depth of the first interior region can be less than the length of the filter. In such embodiments, the second externally-facing threads can be configured to extend into the fluid container body when the adapter 208 is secured by the first externally-facing threads. Additionally, in such embodiments, the threaded adapter 208 can be configured to hold the filter inside the body of the fluid container while the first externally-facing threads 214 engage with the first internally-facing threads.

Additionally or alternatively, the threaded adapter 208 can include a cap with third internally-facing threads, which are configured to secure the cap to the third externally-facing threads of the adapter 208. The cap can be a straw cap, a sip cap, a standard cap, a tethered cap, a spigot, a spout, a dispensing valve, a bite valve, a tube connector, a hose, a primer pump, or a shower head.

Figure 3A:
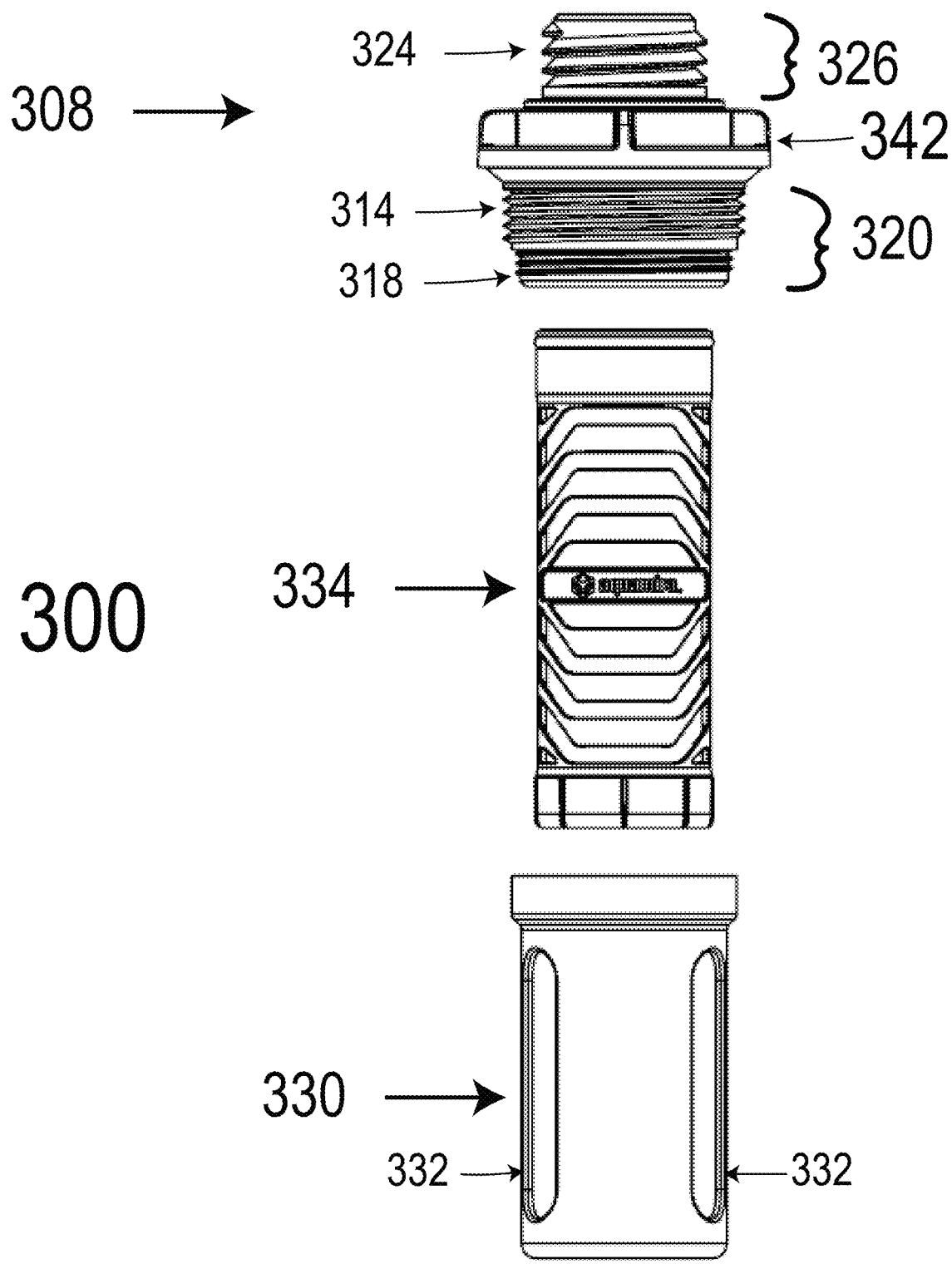
FIG. 3A is an exploded view of a filter assembly configured to attach to a fluid container, in accordance with embodiments of the present technology

FIG. 3A is an exploded view of a filter assembly 300 configured to attach to a fluid container, in accordance with embodiments of the present technology. The filter assembly 300 includes a threaded adapter 308. The threaded adapter 308 includes first externally-facing threads 314 having a first diameter and configured to engage with first internally-facing threads of the fluid container. The threaded adapter 308 includes second externally-facing threads 318 at an intruding end 320 of the adapter 308. The second externally-facing threads 318 have a second diameter less than the first diameter. The threaded adapter includes third externally-facing threads 324 at an extruding end 326 of the adapter and configured to extend away from the fluid container when the adapter 308 is secured to the fluid container by the first externally-facing threads 314. The adapter 308 includes a first interior region adjacent the intruding end, a second interior region adjacent the extruding end, and a step region between the first interior region and the second interior region including a seating surface perpendicular to axes of the first and second cylindrical shapes. The first interior region, the step region, and the second interior region are axially aligned and configured to permit a fluid to pass between the intruding end 320 and the extruding end 326 of the threaded adapter. The adapter 308 includes a filter cage 330 with second internally-facing threads configured to secure the filter cage 330 to the second externally-facing threads 318. The filter cage 330 includes an interior volume configured to retain a filter 334 and openings 332 configured to permit the fluid to pass therethrough. The filter assembly includes a filter 334 (e.g., a canister filter, a cylindrical filter, or a filter media) disposed within the interior volume and configured to cause the fluid to pass from the openings 332 of the filter cage 330 through the filter 334. How the filter 334 is disposed in the threaded adapter 308, and how fluid passes through the filter 334, is shown in greater detail in FIG. 3B. The filter assembly 300 includes a cap.

Figure 3B:
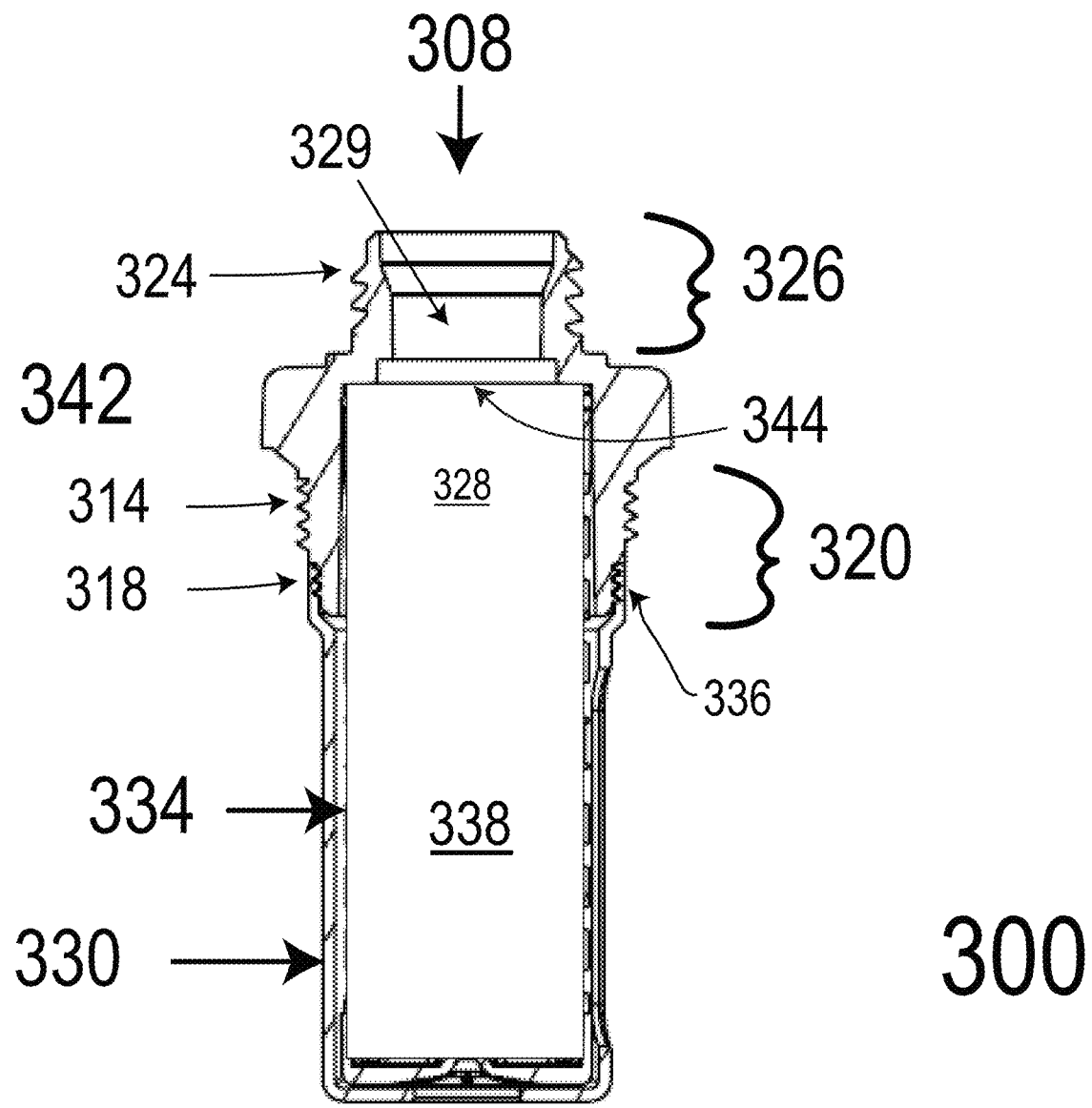
FIG. 3B is a cutaway view of a filter assembly configured to attach to a fluid container, in accordance with embodiments of the present technology.

FIG. 3B is a cutaway view of a filter assembly 300 configured to attach to a fluid container, in accordance with embodiments of the present technology. The filter assembly 300 includes a threaded adapter 308. The threaded adapter 308 includes first externally-facing threads 314 having a first diameter and configured to engage with first internally-facing threads of the fluid container. The threaded adapter 308 includes second externally-facing threads 318 at an intruding end 320 of the adapter 308. The second externally-facing threads 318 have a second diameter less than the first diameter. The threaded adapter includes third externally-facing threads 324 at an extruding end 326 of the adapter, which are configured to extend away from the fluid container when the adapter 308 is secured to the fluid container by the first externally-facing threads 314. The threaded adapter 308 also includes a first interior region 328 belonging to the intruding end 320 having a first opening and a cylindrical shape with a first interior diameter. The threaded adapter 308 also includes a second interior region 329 belonging to the extruding end 326 having a second opening and a cylindrical shape with a second interior diameter less than the first interior diameter. The threaded adapter 308 also includes a step region 344 between the first interior region 328 and the second interior region 329 including a seating surface perpendicular to axes of the first and second cylindrical shapes. The first interior region 328, the step region 344, and the second interior region 329 are axially aligned and configured to permit a fluid to pass between the intruding end 320 and the extruding end 326 of the threaded adapter. The adapter 308 includes a filter cage 330 with second internally-facing threads 336 configured to secure the filter cage 330 to the second externally-facing threads 318. The filter cage 330 includes an interior volume 338 configured to retain a filter 334 and openings configured to permit the fluid to pass therethrough. The filter assembly includes a filter 334 (e.g., a canister filter, a cylindrical filter, or a filter media) disposed within the interior volume 338 and configured to cause fluid to pass from the openings of the filter cage 330 to the filter, and then through the seating surface of the step region 344, into the second interior region 329, and out through the second opening belonging to the extruding end 326 of the threaded adapter 308.

The filter assembly 300 can include a cap. The threaded adapter 308 can include a ridged ring 342, as illustrated, to provide leverage for insertion and removal. The seating surface of the step region 344 can include an inlet configured to attach to the filter 334 and form a seal. The inlet can include a mating O-ring seal, a valve seal, a gasket, or a bayonet-type connection.

Additionally, the filter 334 can have a length and the first interior region 328 can have a depth. The depth of the first interior region 328 can be at least equal to the length of the filter 334 and extend beyond the opening of the fluid container, where the threaded adapter 308 is configured to hold the filter 334 outside of the body of the fluid container while the first externally-facing threads 314 engage with the first internally-facing threads. Alternatively, the depth of the first interior region 328 can be less than the length of the filter 334. In such embodiments, the threaded adapter 308 can be configured to hold the filter 334 inside the body of the fluid container while the first externally-facing threads 314 engage with the first internally-facing threads, and the second externally-facing threads 318 can be configured to extend into the fluid container when the adapter 308 is secured in the fluid container by the first externally-facing threads.

Figure 3C:
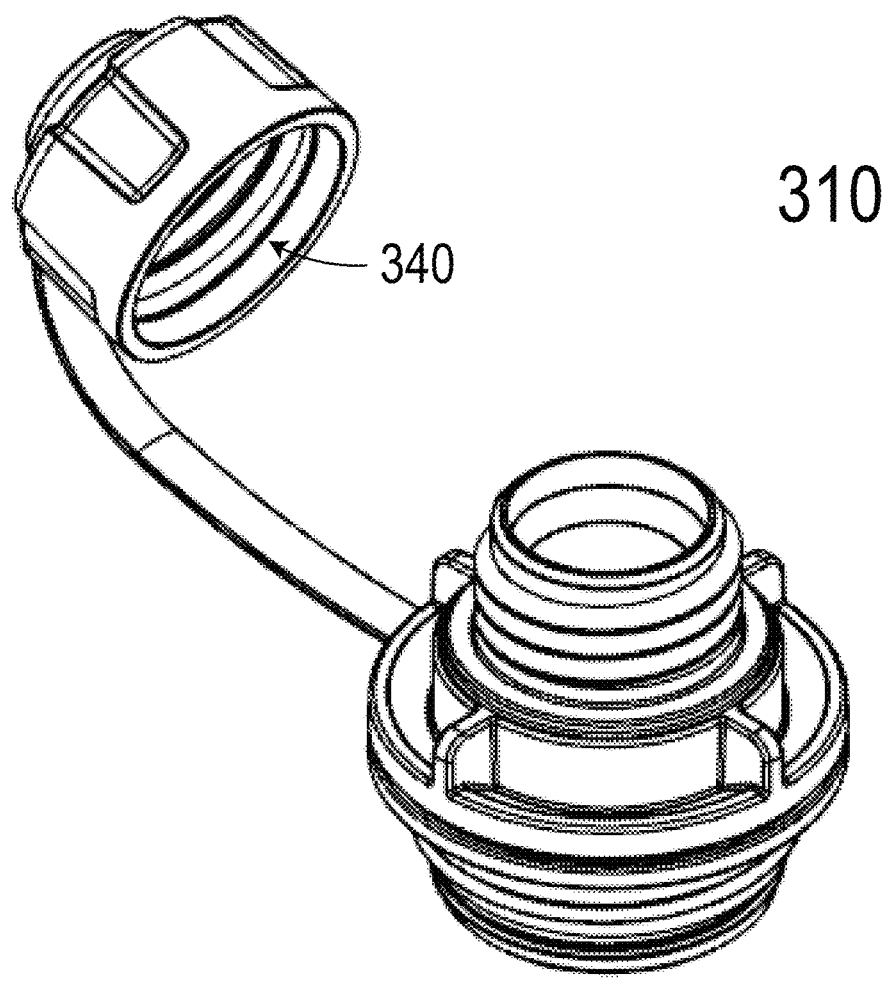
FIG. 3C is a perspective view of a cap belonging to a threaded adapter configured to attach to a fluid container, in accordance with embodiments of the present technology.

FIG. 3C is a perspective view of a cap 310 belonging to a threaded adapter 308 configured to attach to a fluid container, in accordance with embodiments of the present technology. The cap includes third internally-facing threads 340 configured to secure the cap 310 to the third externally-facing threads 324 of the adapter 308. In various embodiments, the cap can be a straw cap, a sip cap, a standard cap, a tethered cap, a spigot, a spout, a dispensing valve, a bite valve, a tube connector, a hose, a primer pump, or a shower head.

Figure 4:
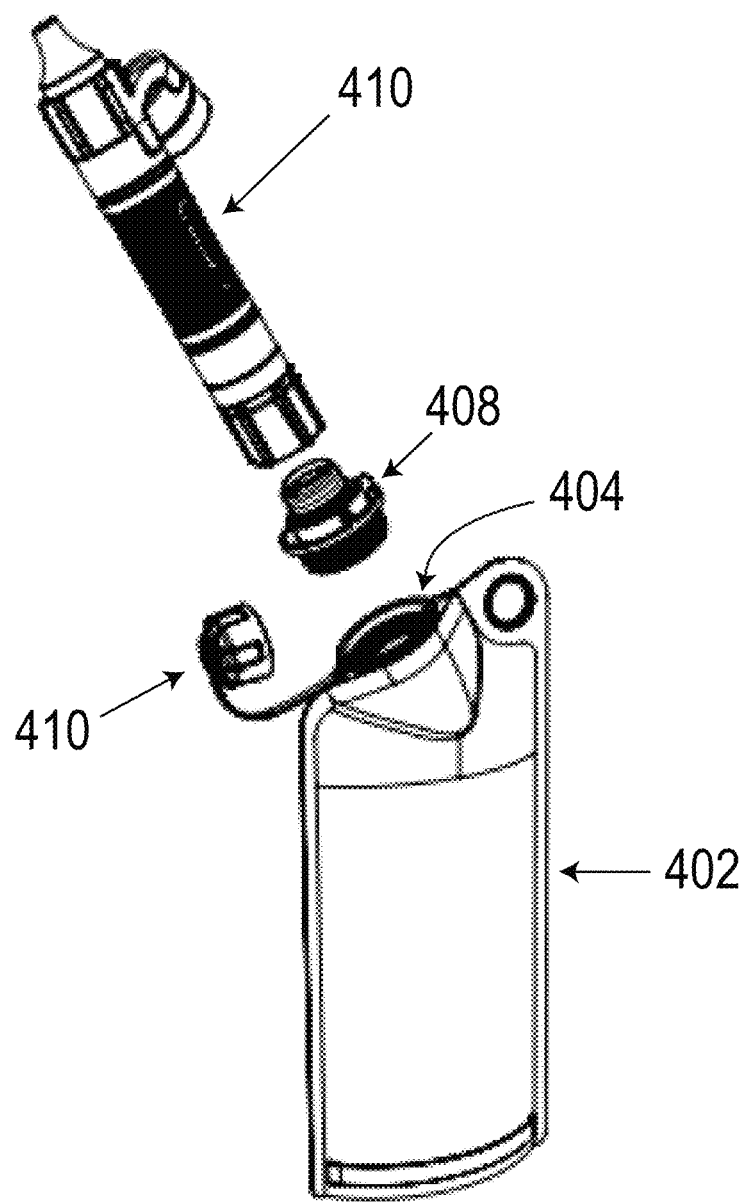
FIG. 4 is a perspective view of a threaded adapter and a filter assembly in accordance with embodiments of the present technology.

FIG. 4 is a perspective view of a threaded adapter 408 and a filter assembly 400 in accordance with embodiments of the present technology. The fluid container 400 includes a body 402 for containing a fluid, the body 402 having an opening 404. The body can have soft sides, as illustrated, or hard sides, and/or the opening can be a seam, a mouth, a neck, or a hole. As illustrated, the threaded adapter 408 can be configured to retain a filter outside the fluid container body 402. The threaded adapter 408 includes first externally-facing threads having a first diameter and configured to engage with first internally-facing threads to secure the adapter 408. In some embodiments, the first internally-facing threads belong to the opening of the container 400; in others, they can belong to a threaded insert. The threaded adapter 408 also includes second externally-facing threads at an interior end of the adapter 408, the second externally-facing threads having a second diameter less than the first diameter. The threaded adapter 408 also includes third externally-facing threads at an exterior end of the adapter, which are configured to extend away from the body when the adapter is secured in the threaded insert by the first externally-facing threads. The threaded adapter 408 includes an external attachment 410. The external attachment 410 includes third internally-facing threads configured to secure the external attachment 410 to the third externally-facing threads of the adapter 408. As illustrated, the external attachment 410 can be a straw filter or another kind of filter external to the fluid container 400. In various embodiments, the external attachment can be a cap, a straw cap, a sip cap, a standard cap, a tethered cap, a spigot, a spout, a dispensing valve, a bite valve, a tube connector, a hose, a primer pump, or a shower head.

Figure 5:
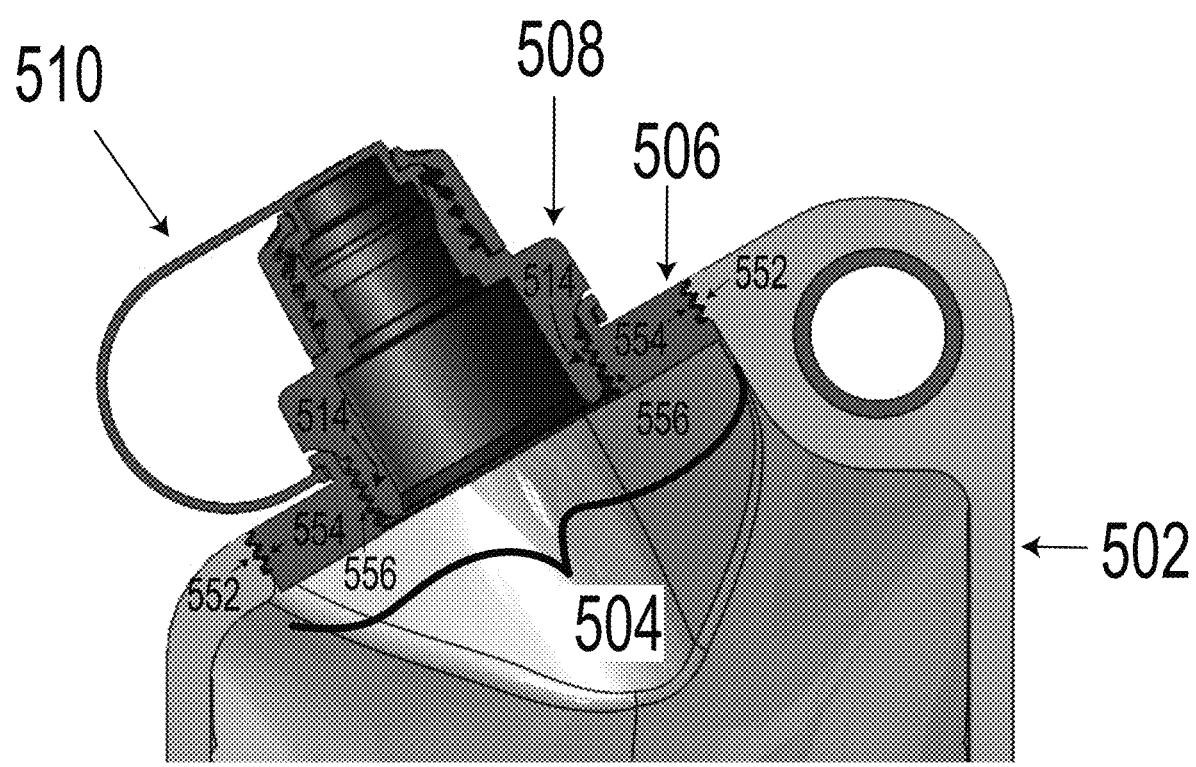
FIG. 5 is a partial sectional view of a threaded adapter fitted in a threaded insert fitted in a wide-necked fluid container.

FIG. 5 is a partial sectional view of a threaded adapter 508 in a conversion fitting 506 fitted in a wide-necked fluid container 500. The wide-necked fluid container 500 can have an opening 504 having fourth internally-facing threads 552, wherein the opening 504 has a fourth diameter that is greater than the first diameter of a threaded adapter 508. The fluid container 500 can have a body 502 with soft sides, as illustrated, or hard sides, and/or the opening 504 can be a seam, a mouth, a neck, or a hole. The conversion fitting 506 can have fifth internally-facing threads 556 configured to engage with the first externally-facing threads 514 of the threaded adapter 508, as in the first externally-facing threads 114 from FIG. 1A engaging with the first internally-facing threads 112 from FIGS. 1E-1F. The conversion fitting 506 can also have fifth externally-facing threads 554 configured to engage with the fourth internally-facing threads 552 of the wide-necked fluid container 500. The conversion fitting 506 can have a football shape or a prolate spheroid shape, and be configured attach to the opening of the fluid container 500. In such embodiments, the opening 504 can be a seam and the fluid container 500 can be a flexible container, a collapsible container, or a foldable container. Alternatively, the conversion fitting 506 can have a circular shape with a flat flange, and be configured to attach to the opening 504 of the fluid container 500, where the opening 504 can be a hole, a mouth, or a neck, and the fluid container 500 can be a rigid container, a semi-rigid container, or a hard-sided container. As illustrated, the wide-necked fluid container can include a cap 510.

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

As used herein, the terms "vertical," "lateral," "upper," "lower," "above," and "below" can refer to relative directions or positions of features in view of the orientation shown in the Figures. For example, "upper" or "uppermost" can refer to a feature positioned closer to the top of a page than another feature. These terms, however, should be construed broadly to include other orientations, such as inverted or inclined orientations where top/bottom, over/under, above/below, up/down, and left/right can be interchanged depending on the orientation.

It should be noted that the methods described above describe possible implementations, and that the operations and the steps may be rearranged or otherwise modified and that other implementations are possible. Furthermore, embodiments from two or more of the methods may be combined.

From the foregoing, it will be appreciated that specific embodiments of the invention have been described herein for purposes of illustration, but that various modifications may be made without deviating from the scope of the invention. Rather, in the foregoing description, numerous specific details are discussed to provide a thorough and enabling description for embodiments of the present technology. One skilled in the relevant art, however, will recognize that the disclosure can be practiced without one or more of the specific details. In other instances, well-known structures or operations often associated with memory systems and devices are not shown, or are not described in detail, to avoid obscuring other aspects of the technology. In general, it should be understood that various other devices, systems, and methods in addition to those specific embodiments disclosed herein may be within the scope of the present technology.

What is claimed is:

1. A threaded adapter, comprising:
   first externally-facing threads having a first diameter;
   second externally-facing threads at a first end of the adapter, the second externally-facing threads having a second diameter less than the first diameter;
   third externally-facing threads at a second end of the adapter opposite to the first end;
   a first interior region adjacent the first end having a first opening and a first cylindrical shape with a first interior diameter, wherein the first cylindrical shape extends past the first externally-facing threads;
   a second interior region adjacent the second end having a second opening and a second cylindrical shape with a second interior diameter less than the first interior diameter; and
   a step region between the first interior region and the second interior region including a seating surface perpendicular to axes of the first and second cylindrical shapes,
   wherein the first interior region, the step region, and the second interior region are axially aligned and configured to permit a fluid to pass between the first end and the second end of the threaded adapter.

2. The threaded adapter of claim 1, further comprising a fluid container, the fluid container including:
   a body for containing the fluid, the body having an opening configured to hold the threaded adapter such that a portion of the second end of the adapter is disposed outside of the opening and a portion of the first end of the adapter is disposed inside of the opening.

3. The threaded adapter of claim 2, further comprising a filter with a third cylindrical shape and an exterior diameter configured to insert into the first opening and form a friction-fit within the first interior region, wherein the filter has a length and the first interior region has a depth.

4. The threaded adapter of claim 3, wherein the filter connects and seals to the first interior region by means of a valve seal, by means of an O-ring, by means of a gasket, or by means of a bayonet connection.

5. The threaded adapter of claim 3, further comprising a filter cage with second internally-facing threads configured to secure the filter cage to the second externally-facing threads, the filter cage including gaps configured to permit fluid to pass into the filter.

6. The threaded adapter of claim 3, further comprising a threaded insert disposed in the opening, the threaded insert including first internally-facing threads, wherein the first externally-facing threads of the threaded adapter are configured to engage with the first internally-facing threads to secure the adapter in the threaded insert in the opening.

7. The threaded adapter of claim 6, wherein the threaded insert is seam-welded in the opening of the fluid container or molded as part of the opening by direct heat, ultrasonic, or radio frequency welding techniques.

8. The threaded adapter of claim 6, wherein the threaded insert is attached to the opening of the fluid container by means of a bulkhead fitting or by radio frequency welding, ultrasonic welding, or gas welding, and wherein the bulkhead fitting seals to the opening by means of a gasket or a valve seal.

9. The threaded adapter of claim 3, wherein the depth of the first interior region is at least equal to the length of the filter, wherein the threaded adapter has a length great enough to hold the filter outside of the body of the fluid container while retaining the filter inside the first interior region and while the first externally-facing threads engage with first internally-facing threads to secure the adapter in the opening.

10. The threaded adapter of claim 3, wherein the depth of the first interior region is less than the length of the filter, wherein the second externally-facing threads are configured to extend into the fluid container body when the adapter is secured in the fluid container opening, and wherein the threaded adapter is configured to hold the filter inside the body of the fluid container while the first externally-facing threads engage with first internally-facing threads to secure the adapter in the opening.

11. The threaded adapter of claim 2, wherein the opening has first internally-facing threads configured to engage with the first externally-facing threads of the adapter to secure the adapter in the opening.

12. The threaded adapter of claim 1, comprising an external attachment with third internally-facing threads configured to secure the external attachment to the third externally-facing threads of the adapter.

13. The threaded adapter of claim 12, wherein the external attachment comprises a filter, a straw filter, a straw cap, a sip cap, an untethered cap, a tethered cap, a spigot, a spout, a dispensing valve, a bite valve, a tube connector, a hose, a primer pump, or a shower head.

14. A threaded adapter configured for a fluid container, the threaded adapter comprising:
   first externally-facing threads having a first diameter, the first externally-facing threads configured to engage with first internally-facing threads in the fluid container;
   second externally-facing threads at an inward end of the adapter, the second externally-facing threads having a second diameter less than the first diameter;
   third externally-facing threads at an exterior end of the adapter, the third externally-facing threads configured to retain an external attachment with mating third internally-facing threads;
   a first interior region adjacent the inward end having a first opening and a first cylindrical shape with a first interior diameter, wherein the first cylindrical shape extends past the first externally-facing threads;
   a second interior region adjacent the external end having a second opening and a second cylindrical shape with a second interior diameter less than the first interior diameter; and
   a step region between the first interior region and the second interior region including a seating surface perpendicular to axes of the first and second cylindrical shapes,
   wherein the first interior region, the step region, and the second interior region are axially aligned and configured to permit a fluid to pass between the inward end and the exterior end of the threaded adapter.

15. The threaded adapter of claim 14, comprising:
   a filter cage with second internally-facing threads configured to secure the filter cage to the second externally-facing threads, the filter cage including an interior volume configured to retain a canister filter, and openings configured to permit the fluid to pass therethrough.

16. The threaded adapter of claim 14, comprising a filter and a fluid container with first internally-facing threads, wherein:
the second externally-facing threads are configured to extend into the fluid container when the adapter is secured in the fluid container by the first externally-facing threads, and
the third externally-facing threads are configured to extend away from the fluid container when the adapter is secured to the fluid container by the first externally-facing threads.

17. The threaded adapter of claim 14, comprising an external attachment with third internally-facing threads configured to secure the external attachment to the third externally-facing threads of the adapter, wherein the external attachment comprises a filter, a straw filter, a straw cap, a sip cap, an untethered cap, a tethered cap, a spigot, a spout, a dispensing valve, a bite valve, a tube connector, a hose, a primer pump, or a shower head.

18. A filter assembly configured to attach to a fluid container, the filter assembly comprising:
a threaded adapter comprising:
first externally-facing threads having a first diameter and configured to engage with first internally-facing threads of the fluid container,
second externally-facing threads at an intruding end of the adapter, the second externally-facing threads having a second diameter less than the first diameter,
third externally-facing threads at an extruding end of the adapter and configured to extend away from the fluid container when the adapter is secured to the fluid container by the first externally-facing threads,
a first interior region adjacent the intruding end having a first opening and a first cylindrical shape with a first interior diameter, wherein the first cylindrical shape extends past the first externally-facing threads,
a second interior region adjacent the extruding end having a second opening and a second cylindrical shape with a second interior diameter less than the first interior diameter, and
a step region between the first interior region and the second interior region including a seating surface perpendicular to axes of the first and second cylindrical shapes,
wherein the first interior region, the step region, and the second interior region are axially aligned and configured to permit a fluid to pass between the intruding end and the extruding end of the threaded adapter.

19. The filter assembly of claim 18, wherein the fluid container includes an opening having fourth internally-facing threads, wherein the opening has a fourth diameter that is greater than the first diameter of the threaded adapter, and the filter assembly comprises:
a conversion fitting, including:
fifth internally-facing threads configured to engage with the first externally-facing threads of the threaded adapter, and
fifth externally-facing threads configured to engage with the fourth internally-facing threads of the fluid container.

20. The filter assembly of claim 18, wherein the filter assembly further comprises:
a filter cage with second internally-facing threads configured to secure the filter cage to the second externally-facing threads, the filter cage including an interior volume configured to retain a filter and openings configured to permit the fluid to pass therethrough; and
a filter disposed within the interior volume and configured to cause the fluid to pass from the openings of the filter cage through a filter media.

* * * * *